No. 881,804. PATENTED MAR. 10, 1908.
R. G. KENNEDY.
DEVICE FOR CONTROLLING A SUPPLY OF WATER FOR IRRIGATING
AND OTHER PURPOSES.
APPLICATION FILED NOV. 8, 1907.

WITNESSES.

INVENTOR.
Robert G. Kennedy
By Wilkinson, Fisher & Witherspoon
his attorneys.

UNITED STATES PATENT OFFICE.

ROBERT GREIG KENNEDY, OF EDINBURGH, SCOTLAND.

DEVICE FOR CONTROLLING A SUPPLY OF WATER FOR IRRIGATING AND OTHER PURPOSES.

No. 881,804.   Specification of Letters Patent.   Patented March 10, 1908.

Application filed November 8, 1907. Serial No. 401,331.

*To all whom it may concern:*

Be it known that I, ROBERT GREIG KENNEDY, a subject of His Majesty the King of England, residing at Edinburgh, Scotland, have invented a new and useful Improvement in Devices for Controlling a Supply of Water for Irrigation and other Purposes, of which the following is a specification.

The invention relates to an improved device for controlling the distribution of water for irrigation, with the object of insuring either a fixed definite constant supply, however the conditions usually affecting the supply may vary, or insuring a known indicated supply for any given condition in the supply channel, both of these requirements being met so as to suit the practical working of irrigation.

Figure 1:
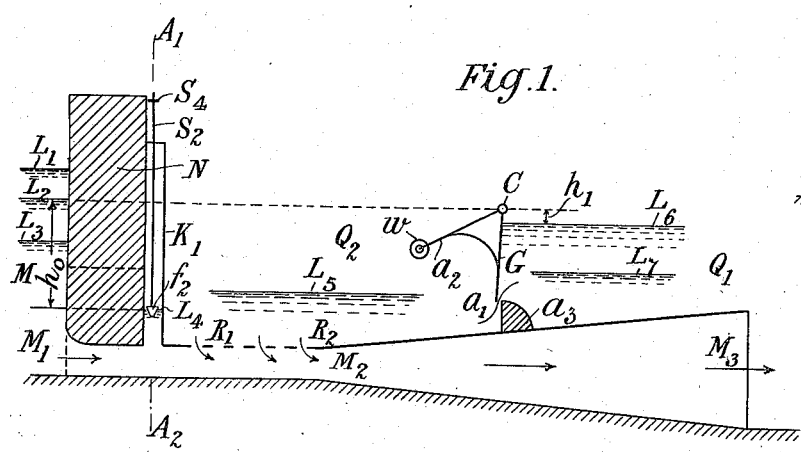
Figure 2:
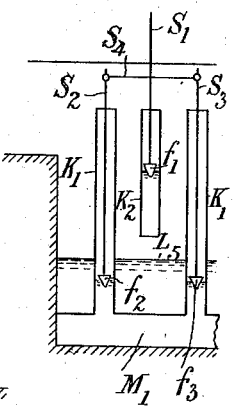
Figure 3:
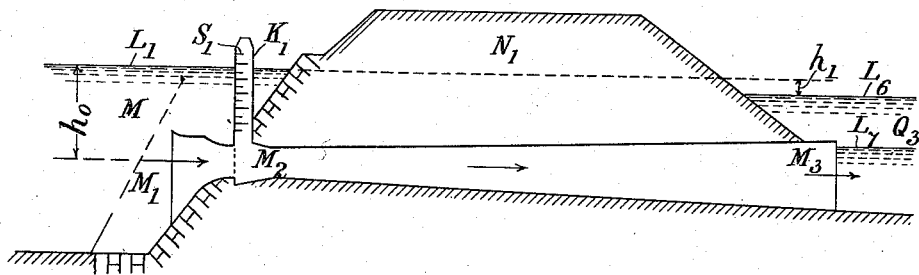
Figure 5:
Figure 4:
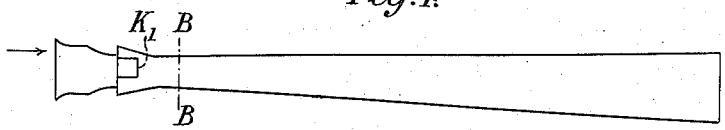
Figure 6:

In the accompanying drawing: Figure 1 is a sectional elevation parallel to the flow, of a device embodying my invention and drawn more or less diagrammatically to simplify description. Fig. 2 is a transverse section thereof on line $A_1$—$A_2$ of Fig. 1. Fig. 3 is a sectional elevation of a modified form of my invention. Fig. 4 is a part plan thereof. Fig. 5 a front elevation looking in the direction of the arrow on Fig. 4, and Fig. 6 is a transverse section on line B—B of Fig. 4.

The device illustrated in Figs. 1 and 2 may be termed a reflux module and is adapted for use at the head of a distributary or "Lateral" and is capable of regulation by the canal staff so as to continue any desired discharge, even when the conditions change and would take off from some feeder channel of which M (Fig. 1) is either the side, or a chamber connected with the said channel by any ordinary gate or planks, the latter not being shown. The supply from M passes through a dividing wall N into a bell mouthed aperture at $M_1$ forming the entrance to a flume $M_1$ $M_2$ $M_3$ or exit way preferably rectangular in section (as shown in Fig. 2) and thence into the outfall $Q_1$. Up to the point $M_2$ the height and waterway of this flume is constant, but beyond this it splays out in a wedge shaped form $M_2$ $M_3$, into a larger water way, so that for a given discharge passing out the velocity is necessarily greatest in $M_1$ $M_2$ and decreases thereafter until it reaches its minimum at $M_3$. The level in M may vary between $L_1$ and $L_3$ but is here taken *pro tem* as being at $L_2$; the outfall level being presumed at $L_6$, though it may sink to $L_7$ as a minimum when the lowest discharge is passing into the outfall $Q_1$. The difference of level in M and $Q_1$ is shown as $h_1$, and this is the "head" which causes the outflow along $M_1$ $M_2$ $M_3$.

Adjoining the wall N are two stand pipes $K_1$ (Figs. 1 and 2) open at the top to the air and connected to the part $M_1$ $M_2$ of the flume $M_1$ $M_2$ $M_3$ at the bottom, so that the flowing water in the latter rises in these pipes to a certain level—shown as $L_4$—; this height being calculable theoretically from the values of $h_1$ and the waterway and shape or form of the flume. The discharge passing can also be calculated from the difference of level in M and in $K_1$ viz. that between $L_2$ and $L_4$ in this case, which is shown as $h_0$ in Fig. 1— the waterway in $M_1$ $M_2$ being of course also known. In order to readily observe this difference of level $h_0$, a suitable differential gage is employed a convenient form of which is shown in Fig. 2 and consists of the two similar pipes $K_1$ and a central pipe $K_2$ in which latter the water standing is connected with and stands at the same level as that in M; *i. e.* $L_2$ here. In each of these three pipes floats $f_1$ $f_2$ and $f_3$ with light vertical rods attached $S_1$ $S_2$ and $S_3$ rise and fall as the corresponding levels vary in $K_1$ and $K_2$. The top of the rods $S_2$ and $S_3$ are hinged lightly on to a horizontal rod $S_4$; and the rod $S_1$ passes loosely through a hole in $S_4$. On $S_1$ is marked a scale, which would read zero at the crossing of $S_4$ when all three tubes had the same level of water in them; and the arrangement is such that when not at the same level, the scale would indicate the difference of level of water in $K_2$ and that in the two similar tubes $K_1$ (where both the latter would usually have the same level) *i. e.* it would indicate $h_0$. Instead however of graduating this scale $S_1$ to these values of $h_0$, the values of the discharge passing in cubic feet per second will be so graduated, (as this depends directly on $h_0$, and is calculable therefrom) that a glance at the scale $S_1$ at any time will show the discharge passing at that moment.

Obviously any form of differential gage can be used, or if desired one of the ordinary self-recording charts of discharge could be attached. The discharge would ordinarily vary as the level of water in M changed and in order to keep it constant under such fluctuations the following weir device is used. Part of the outflow is allowed to flow back again or reflux from $Q_1$ over a sill $a_3$ and under a swinging loose shutter G at $a_1$, into a chamber $Q_2$ just above the exit flume $M_1$ $M_2$ $M_3$. On the top of $M_1$ $M_2$ are a few long narrow openings between $R_1$ and $R_2$ into which this reflux water having risen to some level $L_5$ above the level $L_4$, forces its way and is again ejected along $M_2$ $M_3$. The shutter G, swinging loosely on its axis C, has an arm $a_2$ rigidly connected with it, at the end of which loose adjustable weights $w$ can be placed as required, these latter keeping the shutter in equilibrium against the water pressure from the outfall $Q_1$.

The action would be as follows: Suppose that with the level in M at $L_2$ it is required to deliver a discharge of D cubic feet per second. If on reading the scale $S_1$ it is found that more than D is passing then the weights $w$ are decreased thus allowing the pressure of the water in $Q_1$ on the shutter G to force the latter more open and permit more water to pass through $a_1$ into $Q_2$ thus raising the level $L_5$ and increasing the reflux into $M_1$ $M_2$ and increasing the pressure there and at the pipe $K_1$ so that less discharge can pass in at $M_1$; the increased level at $L_4$ indicating at once on the scale $S_1$ what this decrease really is. This adjustment (or its reverse) would be continued till the required discharge D was obtained and read on $S_1$, and thereafter any variations in discharge due to fluctuations in level at $L_2$ would be automatically corrected by the opening or closing of G in exactly the same way as just described. Thus if the level at $L_2$ sank, less discharge would temporarily pass out, the level in $Q_1$ would slowly sink, giving a decreased pressure on G causing it to partly close, thus diminishing the reflux water and lowering the pressure in $M_1$ $M_2$ and therefore also the level in $K_1$, so that a greater discharge again flows. The arrangement is such that any very small change of level in $Q_1$ causes a comparatively large increase of waterway at $a_1$, so that the error must always be very small. Any excessive fluctuation in level at $L_2$ would ordinarily be corrected by adjusting the head gate or planks on the distributary bank, in the comparatively few cases where such occur.

Instead of the shutter G being a swinging one it could be made a simple board without the arm $a_2$ or weights $w$, and simply capable of being moved up or down as an ordinary weir plank, over the top of which any excess rise in $Q_1$ would spill back into $Q_2$. In this case the top C would be adjusted higher or lower so as to vary the reflux overflow as required, there being no opening at $a_1$.

The principal advantages of such a device may be set forth as below:—

(1.) Instead of having to gage the discharge by a small "head" $h_1$ (as is usually done) much too small for correct results; an artificially increased "head" $h_0$ is obtained by means of a flume of varying cross section; $h_0$ being obtained at the position of smallest cross section of known fixed dimensions.

(2.) The utilizing of this artificial head $h_0$ to gage and indicate the discharge passing through the part of flume of smallest section, and not merely the head $h_0$, the former being calculated from the latter.

(3.) The direct indicating of the discharge on a differential gage and scale so as to read off at a glance the actual discharge passing at any moment.

(4.) By means of reflux water and an adjustable weir to provide means for adjusting the discharge to any figure required, and thereafter any fluctuations in the source of supply, which would otherwise cause error, being automatically adjusted so as to keep the required discharge practically constant.

The modified form of device illustrated in Figs. 3 to 6 and which may be termed a "meter outlet" is on the same principles as the larger device but is simplified so as to serve for discharging smaller quantities of water into cultivators, water courses without regulation and similar parts are indicated by similar letters of reference to those employed in the case of the larger device. Here the flume $M_1$ $M_2$ $M_3$ is preferably a conical pipe with an enlarged entry at $M_1$ (the form of which may be varied) so as to save loss of "head" there, the whole being buried in the distributary bank $N_1$. There are no floats or rods and only one pipe $K_1$, open at its top to the air, and below opening into the flume at $M_2$, where the latter is given an enlarged conical section. Into this conical chamber the jet from $M_1$ enters through the smallest diameter of flume where the area will be very carefully measured and form the basis of calculations. There will be here no reflux water and $K_1$ will usually have no water in it serving merely as an opening to the air and to carry a scale $S_1$ on its upper part on the edge of the distributary M. The design and the dimensions and form of $M_1$ $M_2$ $M_3$ will be calculated so that with a minimum small working "head" $h_1$, there will never be any pressure head on the jet when it enters the conical chamber at $M_2$, i. e. no pressure over the atmospheric pressure, or in other words no water would ever stand in $K_1$. To facilitate inspection by eye or rod as to this being so, the pipe $K_1$ is preferably placed on one side, so as to be over the side of jet. Should however this minimum head $h_1$ increase, then the tendency would be for the pressure at $M_2$, to become negative i. e. less than the atmospheric pressure, but this is prevented by $K_1$ giving an open access to the air, so that atmospheric pressure will always exist in the conical chamber at $M_2$, the enlargement there allowing the free circulation of air all round the jet, and we can then look upon the device as an orifice (at $M_2$) leading into the open air from a vessel represented by M. The discharge would then simply, for a given size of orifice at $M_2$, depend on the height of the supply level $L_1$ above the center of the orifice, i. e. on $h_0$ (Fig. 3), and be therefore entirely independent of the level in the outfall $Q_3$, so long as not less than the minimum $h_1$ obtained. Should less than $h_1$ exist then water would rise in $K_1$ thus indicating to all concerned that the "head" was insufficient, and that either the outfall $Q_3$ must be cleared out or the supply level raised. The necessary calculations as to $h_0$, $h_1$ and section of flume and the like are all simple and well known to theory. Since the discharge for any given sized orifice simply depends on $h_0$, the outside of $K_1$ can be used and graduated as a scale, showing not only the heads $h_0$, but also directly the discharges calculated from these values of $h_0$, so that the water level at $L_1$ or any other level would indicate on the scale the discharge passing, quite independently of the level in the outfall.

To insure any required discharge being passed for any given level in M all that would be necessary would be to simply bury the whole in the bank $N_1$ at such a depth that the required discharge would be read at that given level on the scale $S_1$. This given level would ordinarily be the normal full supply level in the distributary which usually in well established channels does not vary much; should it however so vary after long use then all that is wanted is to dig out the whole and replace at the new required level. For supplies less than the full supply less discharge would be given by the outlet i. e. as the available supply in the feeder channel fell so also would the outfall discharges proportionately decrease, and be indicated on the scale.

The principal advantages of this modified device are

1. That an artificially increased "head" of water is obtained, by employing a flume or pipe of contracted and splayed out shape, such "head" being much larger than the "head" or difference of level in the supply and outfall channels usually observed, whereby greatly increased accuracy of measurement is possible i. e., $h_0$ is obtained instead of $h_1$, as a gage of the discharge.

2. By employing a stand pipe $K_1$ for admitting air pressure all round the most contracted waterway of the pipe, the discharge passing out is rendered independent of the level in the outfall and therefore beyond the interference of the persons interested in the supply.

3. By providing a graduated discharge scale and utilizing the above artificial head $h_0$ in the manner described, the actual discharge passing at any moment is indicated.

4. The obtaining of any desired discharge for a given level of supply by merely placing the whole apparatus on a certain indicated level below the supply level in the distributary. (For levels in the supply channels lower or higher than that fixed in (4) the discharge will decrease or increase proportionately as the supply does i. e. a proportional indicated discharge will be given).

It is to be understood that the expression "flume" as used in the claims is intended to apply to any form of conduit, passage, pipe, or equivalent adapted to connect the supply and outfall channels and having the effect and for the purpose set forth in the specification, and likewise the expression "dividing wall", is intended to apply to any bank or like structure separating the supply channel from the outfall channel.

What I claim is:—

1. In devices for controlling water supply and in combination, a flume having contracted and expanded parts connecting a supply channel with an outfall channel, whereby an artificially increased head of water is obtained, means for insuring that the discharge passing out is independent of the outfall level, and means for utilizing the artificial head of water to indicate the discharge passing at any moment.

2. In devices for controlling water supply and in combination, a flume having contracted and expanded parts for connecting a supply channel with an outfall channel, whereby an artificially increased head of water is obtained, a stand pipe opening into said flume, and means for utilizing the artificial head of water to indicate the discharge passing at any moment.

3. In devices for controlling water supply and in combination, a flume having contracted and expanded parts for connecting a supply channel with an outfall channel, whereby an artificially increased head of water is obtained, a stand pipe opening into said flume and open to the air, and a scale for indicating the discharge passing to the outfall at any moment.

4. In devices for controlling water supply and in combination, a flume of varying diameter for connecting a supply channel with an outfall channel to obtain an artificially increased head of water, a stand pipe opening into said flume, and a gage for indicating the discharge passing at any moment.

5. In devices for controlling water supply and in combination, a flume of varying diameter having a bell mouthed opening for connecting a supply channel with an outfall channel to obtain an artificially increased head of water, means for insuring that the discharge passing is independent of the outfall level and means for utilizing the artificial head of water to indicate the discharge passing at any moment.

6. In devices for controlling water supply and in combination, a flume of varying diameter for connecting a supply channel with an outfall channel to obtain an artificially increased head of water, a dividing wall between the supply and outfall channels out of which said flume opens, a stand pipe opening into said flume, and means for indicating the discharge passing at any moment.

7. In devices for controlling water supply and in combination, a flume of varying diameter for connecting a supply channel with an outfall channel to obtain an artificially increased head of water, a dividing wall between the supply and outfall channels out of which said flume opens, a plurality of stand pipes opening into said flume and means for indicating the discharge passing at any moment.

8. In devices for controlling water supply and in combination a flume of varying diameter for connecting a supply channel with an outfall channel to obtain an artificially increased head of water, a dividing wall between the supply and outfall channels out of which said flume opens, a plurality of stand pipes opening into said flume, floats in said stand pipes and an indicating device acting in conjunction with said floats to register the discharge passing at any moment.

9. In devices for controlling water supply and in combination, a flume of varying diameter for connecting a supply channel with an outfall channel and having openings therein connecting with the outfall channel, a dividing wall between the supply and outfall channels, a plurality of stand pipes opening into said flume on the supply side of the aforesaid openings in the flume, means for indicating the discharge passing at any moment, and an adjustable weir device connecting the outfall with the aforesaid openings for keeping the discharge constant.

In testimony whereof I have hereunto set my hand in the presence of two subscribing witnesses.

ROBERT GREIG KENNEDY.

Witnesses:
AULDA FRASER,
CHRISTINA MARQUIS.